United States Patent
Holm-Petersen

(10) Patent No.: US 8,671,005 B2
(45) Date of Patent: Mar. 11, 2014

(54) INTERACTIVE 3D SHORTAGE TRACKING USER INTERFACE

(75) Inventor: Morten Holm-Petersen, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 1991 days.

(21) Appl. No.: 11/591,689

(22) Filed: Nov. 1, 2006

(65) Prior Publication Data

US 2008/0103863 A1    May 1, 2008

(51) Int. Cl.
 *G06Q 10/00*     (2012.01)
(52) U.S. Cl.
 USPC ..................................... 705/7.12; 345/440.2
(58) Field of Classification Search
 USPC ............................ 705/8, 7.12; 345/440, 440.2
 See application file for complete search history.

(56) References Cited

U.S. PATENT DOCUMENTS

| | | | |
|---|---|---|---|
| 6,163,761 A | 12/2000 | Kent | |
| 6,370,509 B1 * | 4/2002 | Ross et al. | 705/7 |
| 6,462,736 B1 * | 10/2002 | Ross et al. | 345/419 |
| 6,486,899 B1 * | 11/2002 | Bush, Jr. | 715/855 |
| 6,577,304 B1 * | 6/2003 | Yablonski et al. | 345/419 |
| 6,642,946 B1 | 11/2003 | Janes et al. | |
| 6,801,901 B1 | 10/2004 | Ng | |
| 6,947,905 B1 * | 9/2005 | Starr et al. | 705/37 |
| 7,639,256 B1 * | 12/2009 | Yablonski et al. | 345/440 |
| 2002/0054170 A1 | 5/2002 | Rush et al. | |
| 2003/0046141 A1 | 3/2003 | Kamal | |

(Continued)

FOREIGN PATENT DOCUMENTS

| JP | 0844789 | 2/1996 |
|---|---|---|
| JP | 200494770 | 3/2004 |

(Continued)

OTHER PUBLICATIONS

International Search Report based on International Patent Application No. PCT/US2007/080662—Filed Oct. 7, 2007: Date of Mailing: Jan. 28, 2008.

(Continued)

*Primary Examiner* — Susanna M Meinecke Diaz
(74) *Attorney, Agent, or Firm* — Damon Rieth; Leonard Smith; Micky Minhas

(57) ABSTRACT

The claimed method and system provides a user interface that displays a plurality of product order bars (icons) along with a set of dependencies between product orders in a single graphical view. A plurality of iconic bars are used to represent a demand or product order for a segment of a production process. Each bar may indicate a total quantity of raw material ordered at the segment or quantity of raw material incorporated in work-in-progress products ordered at the segment. Each bar may also indicate raw material that will be available to the segment and allocated to the segment. At the same time, each bar may indicate an unavailable portion or deficient quantity of the raw material required at the segment. A time axis may be used to indicate the expected availability (or delivery) times of the bars (orders). Additional stock material that is readily available may also be displayed to indicate that stockpiled material may be used to remedy some of the deficiencies in product orders. Connecting lines may be drawn between bars to indicate a flow of the raw material from one segment of a production process to another. The bars may be updated dynamically when a production planner renders a reallocation of raw material.

15 Claims, 7 Drawing Sheets

(56) References Cited

U.S. PATENT DOCUMENTS

| | | | |
|---|---|---|---|
| 2003/0050826 | A1 | 3/2003 | Cargille et al. |
| 2003/0212590 | A1 | 11/2003 | Klingler |
| 2004/0199541 | A1 | 10/2004 | Goldberg et al. |
| 2005/0159971 | A1 | 7/2005 | Woehler |
| 2005/0261975 | A1 | 11/2005 | Carver |
| 2005/0288979 | A1 | 12/2005 | Guest |

FOREIGN PATENT DOCUMENTS

| | | | |
|---|---|---|---|
| KR | 10-2004-0093680 | A | 8/2004 |
| KR | 1020040093680 | A | 11/2004 |
| KR | 10-2006-0086619 | A | 8/2006 |
| KR | 1020060086619 | A | 8/2006 |
| WO | 2006090844 | A1 | 8/2006 |

OTHER PUBLICATIONS

Written Opinion base on International Patent Application No. PCT/US2007/080662—Filed Oct. 7, 2007; Date of Mailing: Jan. 28, 2008.
Planscape Technologies, "Optimizing Production & Inventory," http://www.planscapetech.com, dated Oct. 6, 2006, 1 page.
Cao et al., "A Simulation-Based Tool for Inventory Analysis in a Server Computer Manufacturing Environment," Proceedings of the 2003 Winter Simulation Conference; pp. 1313-1318; http://delivery.acm.org/10.1145/1040000/1030993/p1313-cao.pdf?key1=1030993&key2=7199300611&coll=GUIDE&dl=GUIDE&CFID=1421221&CFTOKEN=25482669.
Aspen Technology, Inc., Aspen MIMI™, Aspen MIMI (Manager for Interactive Modeling Interfaces) is the most powerful and flexible supply chain optimization modeling and decision support system available; dated Oct. 6, 2006; 6 pages; http://www.aspentech.com/brochures/Aspen_MIMI_Briefing_Sheet.pdf#search=%22production%20planner%20%graphical%20inventory%22.
Gantt chart, Netronic Software, GmbH, www.netronic.com, admitted prior art, i.e., published prior to Nov. 1, 2006.
Netronic Software brochure, www.advizorsolutions.com, admitted prior art, Copyright 2002.
Visible Decisions image, Sep. 1997.
Visible Decisions image 2, Sep. 1997.
Pert Chart graphic, Critical Tools, www.criticaltools.com/pertchartexpertsoftware.htm, admitted prior art, (i.e., published prior to Nov. 1, 2006).
"International Search Report", Mailed Date: Jan. 28, 2008, Application No. PCT/US2007/080662, Filed Date: Oct. 7, 2007, pp. 9. (MS# 318607.02).
"Japanese Notice of Rejection", Mailed Date: May 2, 2012, Application No. 2009-535379, Filed Date: Oct. 7, 2007, pp. 4 (MS# 318607.05).

* cited by examiner

| Item No. | Description | Quantity | Reserved For | Reserved From |
|---|---|---|---|---|
| 34598 | Gear | 1000 | Motor Assembly 2 | Engine Assembly 9 |
| 45757 | Cylinder | 95 | Engine Assembly 4 | Engine Assembly 9 |
| 3838 | Sheet Metal | 266 | Joint Assembly | Body Assembly 33 |
| 0505 | Motor | 433 | Customer 32 | Motor Assembly 340 |

Figure 6

Motor – Production Order

701

| No. | 0505 | Search Description | Motor |
|---|---|---|---|
| Description | Motor | Quantity | 433 |
| | | Due Date | 01/31/08 |

Reservations

| Item | Quantity |
|---|---|
| 553 | 950 |
| 356 | 1002 |
| 233 | 50 |
| ... | ... |

INTERACTIVE 3D SHORTAGE TRACKING USER INTERFACE

BACKGROUND

Existing ERP systems may use a number of order tracking and inventory databases to store information that may be used to determine the availability of various raw material inputs and the status of work-in-progress orders and sales orders in a production process. These same databases may also store information on customers associated with the sales orders. However, when a purchase planner or production planner is faced with a deficiency in a specific raw material, it may be helpful to a planner or manager to understand the consequences of the product deficiency. For example, when a manager learns that a quantity of raw material may not become available at an expected time, it may be beneficial for the manager to understand what other related product orders, such as a work-in-progress orders and final product orders, may be affected.

Existing ERP applications may offer little or no help to a production planner in determining what related production orders may be affected by a deficiency in a raw material order. Existing ERP systems may only present reservations for the raw-material in text-based lists or tables or only show the direct reservations for a raw material in a first production step. Subsequent, dependant production steps, sales orders and customers may not be included in any one table. Thus, the manager may be unable to determine, in an efficient manner, which orders and, consequently, which customers, may get hurt from the product (raw material) deficiency. Furthermore, even if the manager is able to determine possible affected sales orders and customers, the manager may not be provided an efficient way to react to the deficiency by, for example, reallocating an available quantity of the deficient product or material to a production path that optimizes customer service. In other words, the manager may not be able to easily determine an optimal path to reroute available quantities of raw material to where the raw material or product would most benefit a supply company or production company.

SUMMARY

The claimed method and system provides a user interface that displays a plurality of product order bars (icons) along with a set of dependencies between product orders in a single graphical view. A plurality of iconic bars are used to represent a demand or product order for a segment of a production process. Each bar may indicate a total quantity of raw material ordered at the segment or quantity of raw material incorporated in work-in-progress products ordered at the segment. Each bar may also indicate raw material that will be available to the segment and allocated to the segment. At the same time, each bar may indicate, when appropriate, an unavailable portion or deficient quantity of the raw material required at the segment.

In one embodiment, the bars may be disposed on a field aligned along a user point of view. Based on the perspective, immediate demands or production orders in a production process may be disposed near an end of the field appearing as a user proximal end, while bars representing less immediate demands may be disposed towards an end of the field appearing as a user distal end. The longitudinal length of the field (along a line from proximal end to distal end of the field) may be parallel to a time axis that may be used to demarcate the field into time segments indicating the expected availability (or delivery) times of the bars (orders). Additional stock material that is readily available from inventory may also be shown on one side of the field to indicate that stockpiled material may be used to remedy some of the deficiencies in product orders. Connecting lines may be drawn between bars to indicate a flow of the raw material from one segment of a production process to another. Similarly, a connection line may represent a dependency of a downstream product order for an upstream product.

In a further embodiment a set of customer icons may be connected to sales orders for final product, thereby associating sales orders with their customers.

In a further embodiment, the user interface may allow a user to redirect available quantities of input material, such as a raw material or work-in-progress material from one production path to another. In this embodiment, the user interface may update the dependencies and portions of available/unavailable raw material quantities for connected bars in the production process.

DRAWINGS

FIG. 6 illustrates an exemplary production orders database table; and

FIG. 7 illustrates an exemplary view that may be provided by existing ERP systems.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
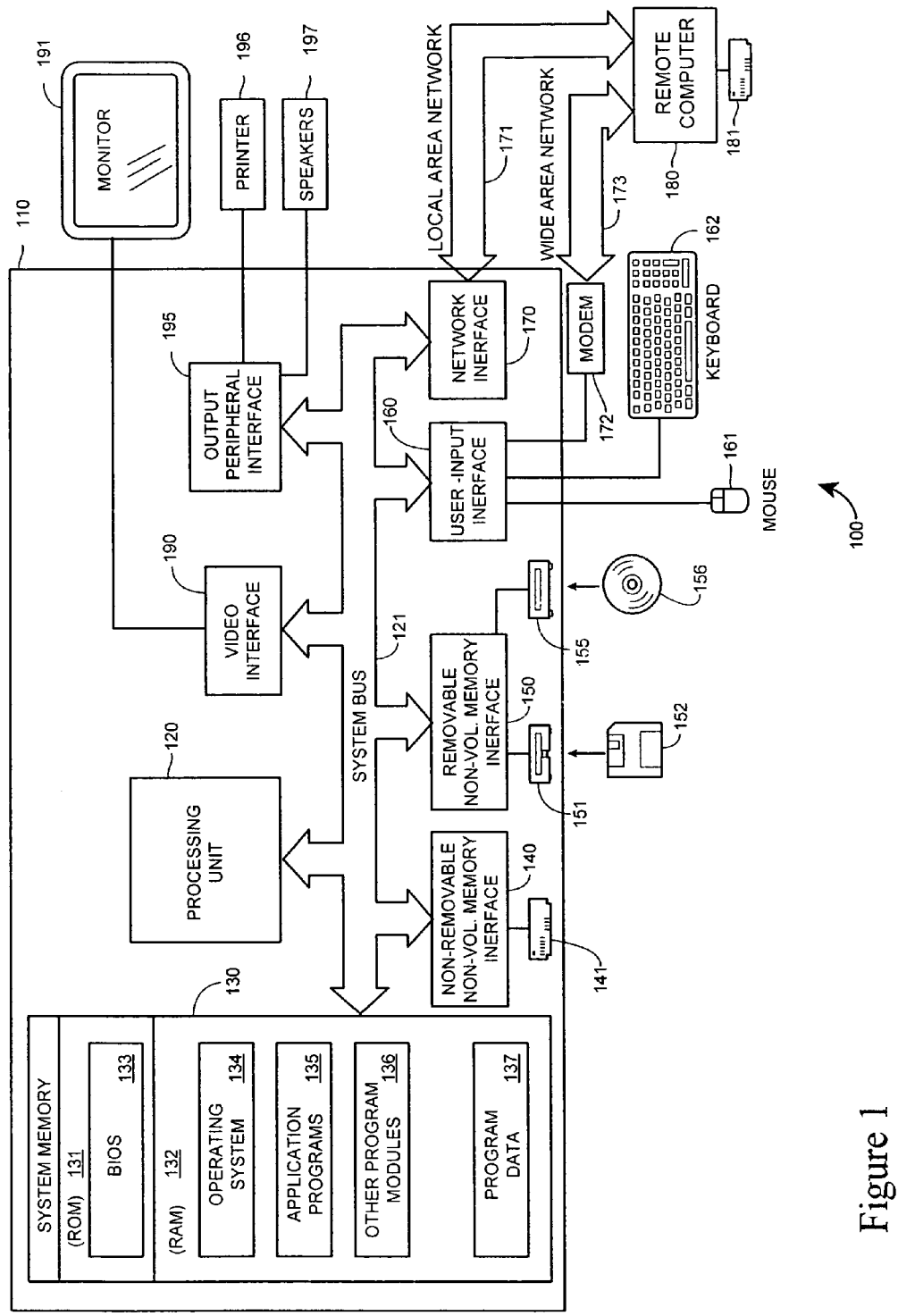
FIG. 1 illustrates a block diagram of a computing system that may operate in accordance with the claims.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

In a general production process, a product order may be for a quantity of raw material, a work-in-progress product order requiring the raw material, or a finished product order dependent on the raw material. A raw material may be considered an input into a defined production process, where the raw material is procured externally to the defined production process. The production process may be defined by a view, which may be circumscribed by a user. A raw material may be purchased from an external third party and usable as an input once received and stored in inventory. Alternatively, a raw material may be produced by a portion of a production process different from the defined view. For example, a raw material may be produced by a different segment of a production process, but located in the same factory or different factory from the defined production process (as defined by the view) and still considered a raw material.

A work-in-progress product may be a product that is produced in an intermediate subassembly of the production process that uses a raw material as an input and/or another work-in-progress product as an input. A finished product may be a terminal product that does not flow as an input into another subassembly. A finished product may be one that is delivered to a customer. The finished product order may also represent a sales order for the finished product and may be associated with a customer (e.g., for delivery to a customer).

Figure 2:
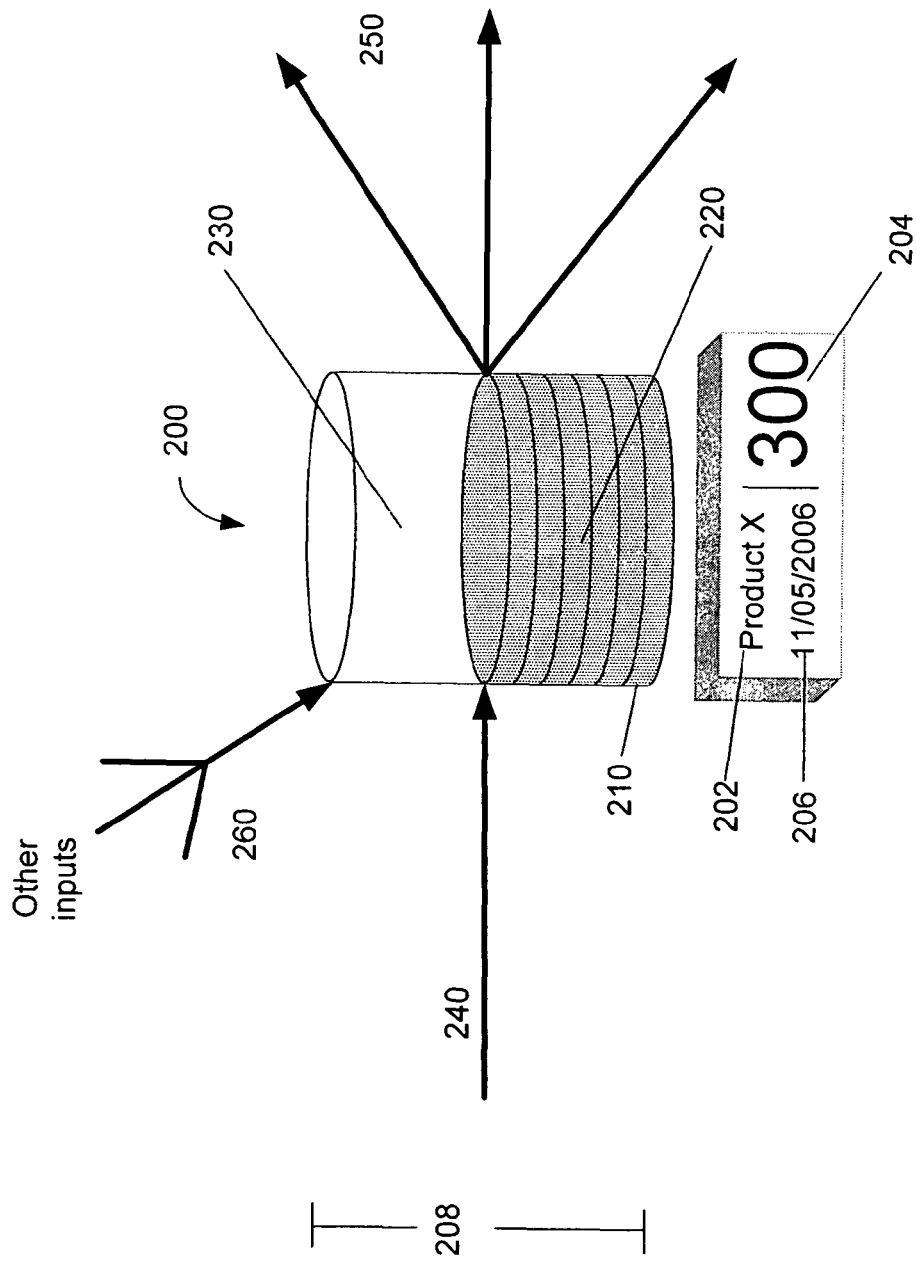
FIG. 2 illustrates an exemplary three dimensional product order bar.

FIG. 2 illustrates a bar 200 that may be used to represent a product order at a segment of a production process. The bar 200 may indicate a segment of the production process it represents by a label 202. If the bar 200 represents a raw material order, then the bar may indicate the total amount of raw material ordered 204 from an external source (e.g., external to the defined production process) and expected to be available (or delivered) for use in the defined production process. In one embodiment, the bar may indicate an availability date 206 or delivery date. If the bar 200 represents a work-in-progress bar, then the bar may indicate the total amount of raw material needed to produce an order for a work-in-progress product at a subassembly corresponding to the work-in-progress bar. If the bar represents a finished product bar, then the bar may indicate the total amount of raw material that is required to produce a finished product at a subassembly corresponding to the work finished product bar and fill a sales order.

In a three dimensional (3D) rendering of the bar 200, as illustrated in FIG. 2, the height 208 of the bar may represent the total quantity of raw material ordered or required to fill an order at the segment of the production process represented by the bar. In one embodiment, the height of the bar 208 may be demarcated by unit volumes 210. In another embodiment, the height of the bar may be determined using a metering stick (e.g., in a legend). It should be understood that while FIG. 2 illustrates a cylindrically shaped bars, other bar shapes may be used as well.

FIG. 2 further illustrates that the bar may indicate the amount of a quantity of raw material available for the order by highlighting a volume of the bar using a first color 220. Similarly, a quantity of the raw material that is deficient, or currently unavailable, for the order or segment of the production process may be indicated by highlighting a remaining volume of the bar using a second color 230. Alternatively, an outline of the remaining volume of the bar from the stack of unit coins 210 of the first color 220 may appear transparent or translucent to indicate the deficient quantity. In this manner, a user may be able to determine from a view of the bar, a quantity of raw material required for the product order at the production segment, the amount of raw material currently available for the product order, and the amount of raw material deficient for the product order.

FIG. 2 further illustrates that the bar may indicate a connection to one or more subassemblies or raw material orders using connection lines 240 and 250. The connection lines 240, 250 may show the relations between product orders. For example, a connection line 240 may represent an inflow of product into the bar from an upstream bar (not shown). This may represent a flow of product from a segment of the production process supplying or producing a first product into the segment of the production process represented by bar 200. Similarly, connections lines 250 may represent an outflow of product produced by the bar 200 (in the case of a subassembly) or product represented by the bar 200 (in the case of a raw material). Because a view of the system may isolate a single raw material for inspection, the connections may also represent the flow of raw material through the production process from one product order to another. In some situations, more input materials are taken as input to a production order than the one material tracked by the view. In this case a small icon 260 with short line ends may be shown just in front of the bar for the production order. This may illustrate that multiple inputs flow into this order, but only the one for the currently tracked material is shown by the bar.

Figure 3:
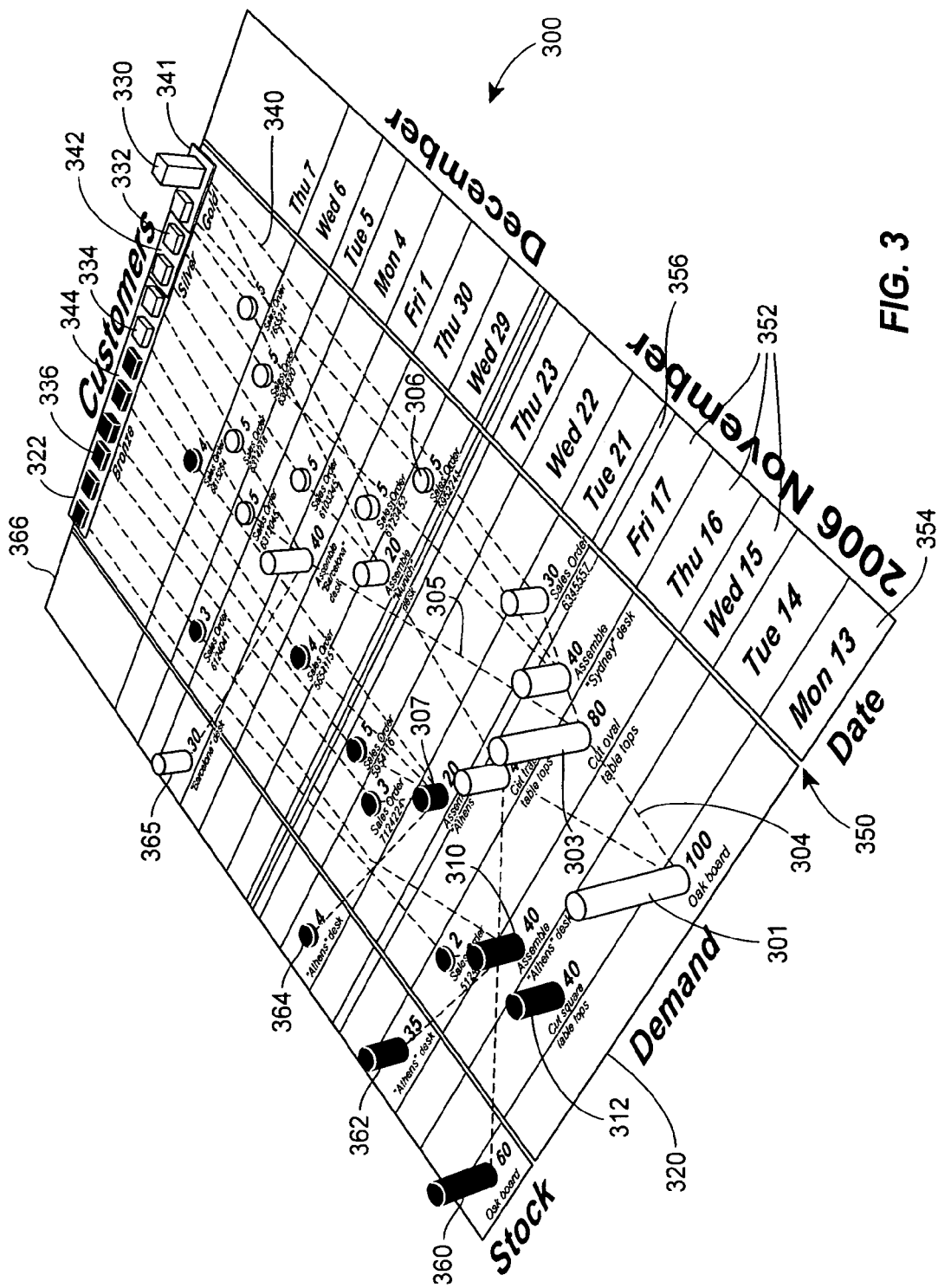
FIG. 3 illustrates an exemplary three dimensional rendering of a production process highlighting the distribution of a selected raw material.

FIG. 3 illustrates a 3D rendering or view of a user interface embodiment. A plurality of bars 301-312 similar to bar 200 of FIG. 2, may be disposed on a field 300. The field may be rendered so that a proximal end 320 of the field 300 may appear to be closer than a distal end 322 based on a user's line of sight or point of view. When a user is interested in the effects of a raw material supply on a production process, the user may define a production process to be observed and identify a raw material to be observed. The user interface may display a raw material bar 301, representing an order for the raw material, and dispose the raw material bar 301 near the proximal end 320 of the field 300. One or more work-in-progress bars 303, 307, 310, 312, may be disposed on the field and connected, where appropriate, using connection lines (e.g., 304, 305), to indicate the relationships between product orders, thereby illustrating the paths for the raw material through the production process. The work-in-progress bars (e.g., 303 and 307) may be disposed further away from the proximal end 320 of the field 300 in an arrangement based on their production order. In other words if raw material A is first consumed by subassembly B, whose work-in-progress is consumed by subassembly C, then A may be disposed at the proximal end, with B further from the proximal end than A, and C even further from the proximal end than B. a set of finished product bars or sales order bars may be disposed sequentially after the work-in-progress bars. As discussed above these, these bars may represent a product to be delivered to a customer to fulfill a sales order of the customer.

A set of customer bars 330-336 may also be displayed near the distal end 322 of the field 300. In this embodiment, connection lines (e.g., 340) between the sales orders and the customer bars may associate the sales orders with customers that placed those sales orders. Also, the customer bars 330-336 may also indicate a total quantity of raw material required to fill the aggregate sales orders for the customer that are dependent on the identified raw material. Similar to the bars described above, the customer bars 330-336 may also indicate using a first and second color, a quantity of raw material available to fill the customer's sales orders and a quantity of raw material unavailable to fill the customer's sales orders. In this manner, a user may be able to determine from the view, the raw material volume needed by each customer to fill their orders and how deficient a customer may be in a raw material to finish the customer's aggregate order. The ratio of available to non-available raw material may also be indicative of the ratio of a customer's aggregate sales orders that may be fulfilled given the displayed allocation of raw material.

In a further embodiment, the priority of a customer may be indicated in the view or rendering. This priority may be based on a value of the customer to a supplier may be indicated by the view or rendering. For example, FIG. 3 illustrates that the customer may be displayed as gold 341, silver 342, or bronze 344 customers. These designations may be supplier/user defined and may be based on, for example, the average volume of orders placed by the customer, the quality of payments by the customer (on-time payments), etc. As further illustrated in FIG. 3, the different sets of customers (e.g., gold 341, silver 342, and bronze 344) may be grouped by priority to make it easier for a user to determine the reallocation goals of a raw material when the raw material supply is deficient.

In yet another embodiment, a time axis along a longitudinal length of the field 350 (e.g., extending from proximal 320 end to distal 322 end) may be used to demarcate the field into lateral time segments 352. In FIG. 3, the lateral time segments 352 indicate days. Of course, the field may be demarcated into larger or smaller segments of time (e.g., second, hours, weeks, months, years, etc.). The time segments 352 may be used to designate an expected order delivery time or availability time. For example, because the raw material bar 300 is disposed on a time segment 354 labeled "Monday the 13th," a quantity of raw material (in this case, 100 units) is expected to be available on the 13th. Also, because not all days in a week may have an expected delivery or event, some time segments may be compressed or folded up into thin bars 356, representing skipped days (or skipped time segments). In a further embodiment, a longitudinal segment (not shown) between lateral time segments may be used to block off a number of days. This longitudinal segment may be used to indicate a duration for producing a product given that an order is received at a time segment at the front of the longitudinal segment. This longitudinal segment may be used, for example, to determine whether certain production steps may be rescheduled to remedy a raw material deficiency.

FIG. 3 may provide a view 300 of the existing planned distribution of an identified raw material through a production process as well as the dependencies between product orders throughout the defined production process. In the example illustrated by FIG. 3, there is an existing order of oak board raw material for 100 units, represented by bar 301. However, the shading of the oak board raw material bar 300 indicates that the oak board may not be available on its expected date (Monday, the 13th). Thus, related product order bars (e.g., 303 and 306) that depend on the raw material are illustrated as deficient (by their color) because of the missing raw material supply.

FIG. 3 further illustrates a set of bars 360-364 disposed on a longitudinal section of the field 366. Bars 360-364 may represent a stockpiled inventory of products. Bars 362, 364, and 365 may represent products output from a production order that are not reserved for any sales orders or customers. It should be noted that in some production processes, a product order may not be delivered directly to a customer, but instead be used to replenish or maintain a quantity of inventory. This may be illustrated by work-in-progress bar 307, which feeds an inventory bar 364. A bar 360 may represent a stockpile of oak board raw material that may be used as input into the process. Because at least a few of the production paths for the oak board raw material is based on the stock piled inventory instead of the raw material order, those few production paths may illustrate at least a partial fulfillment of product orders, as designated by their coloring or shading.

FIG. 3 illustrates a complete view in which the dates may be displayed in a lane on the right side of field 300, while quantities that flow to and from the production orders from inventory may be illustrated in a lane on a left side of field 300. These illustrations also show that the bars representing customers (at the distal end 322 of floor 300) may be colored and grouped by priority (e.g., bronze, silver, and gold). It should be noted that different embodiments may use one or more of the ingredients of the view of FIG. 3, without using all of the ingredients at the same time.

To further assist a user (e.g., a plant manager or production planner) in product planning, the user interface may allow the user to render a reallocation of available raw material or work-in-progress products, thereby effectively changing distribution rules for the raw material. For example, certain enterprise resource planning (ERP) systems may implement rules for how a partial availability of material is to be distributed. In the current embodiment, the user interface may simply adopt the same rules as an underlying ERP system to generate an initial view. Some ERP systems may use a general rule that services earlier placed product orders first, followed by servicing a largest order ahead of a smaller order, when a raw material is deficient. While this rule may be a egalitarian rule, a supplier may prefer to service some sales orders (or some customers) over others. In this case, the supplier may desire to change the allocation of partially available raw material. In this embodiment, the user may then reallocate raw material from one production path to another. For example, in one embodiment, a user may be able to drag a volume of available raw material from one bar (e.g., 310) and drop the volume to another bar (e.g., 303). This may be done between two bars that depend on the same upstream bar (e.g., 360). The bars in FIG. 3, may be displayed with unit quantities, such as 210 in FIG. 2, in the form of coin shaped slices. In this embodiment, a user may be able to drag and drop coins or unit volumes, from one bar to another when attempting to reallocate raw material quantities.

The user interface may further update or refresh the appearance of each bar affected by a reallocation, thereby changing, when appropriate, the coloring of downstream bars. This updating may include refreshing the shading of the customer bars. Using this approach, it may be fathomed that based on a supplier's designation of gold, silver, and bronze, bars, the supplier may endeavor to have the gold customer orders completed first, followed by the silver customers, then bronze customers. In this way the planner can quickly prioritize specific paths across the floor over others and by doing that prioritize specific sales orders over others.

Figure 4:
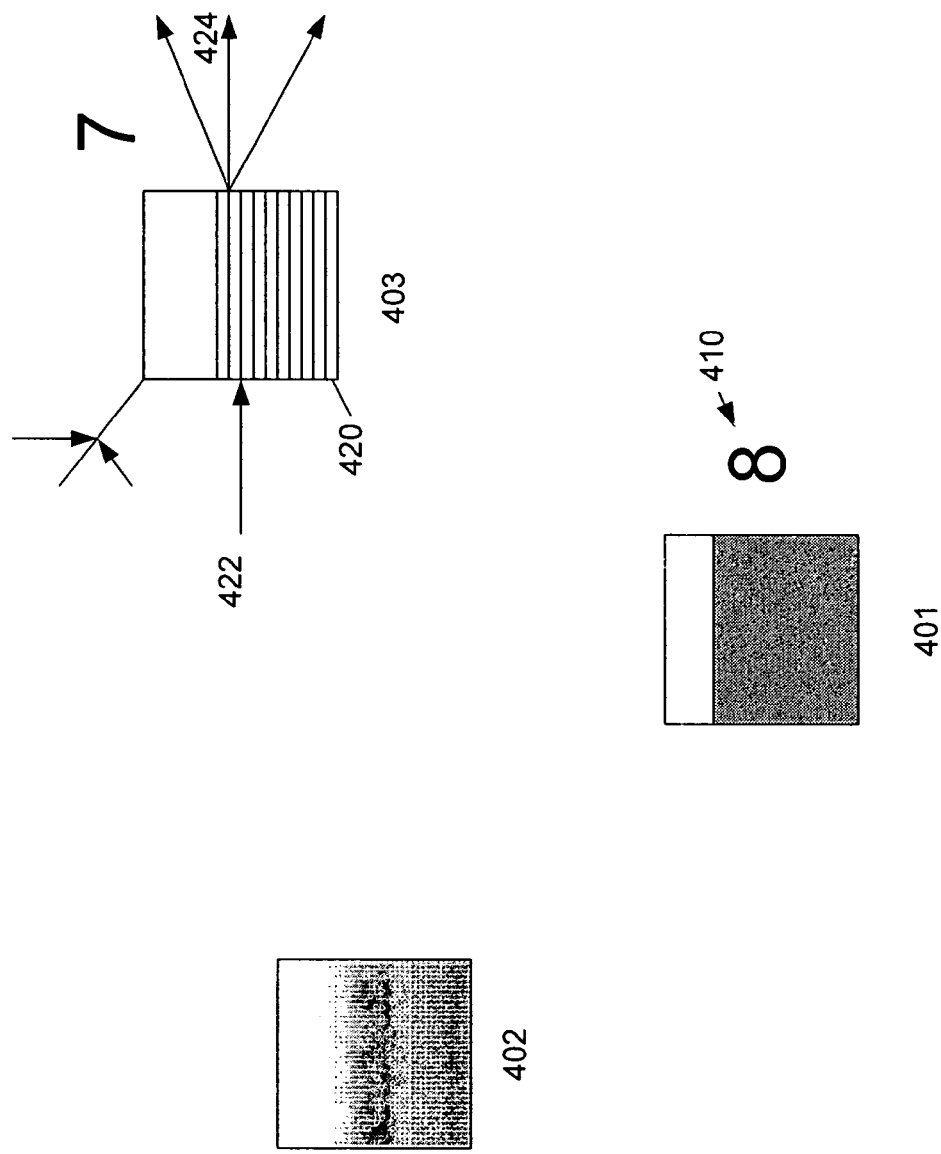
FIG. 4 illustrates an exemplary two dimensional product bar.

FIG. 4 illustrates several two dimensional renderings (2D) 401-403 of the product order bar 200 of FIG. 2. In this embodiment, the total quantity of raw material ordered at the bar (representing a segment of a production process) may be indicated by a number 410 disposed near the bar and associated with the bar. The bar may take on a flat shape, such as a square. A portion of the raw material available and a portion of raw material unavailable for the bar may still be graphically represented using two colors, based on the area shaded by the two colors as illustrated by bar 401. Alternatively, the overall shading of the bar may represent a ratio of available to unavailable raw material, as illustrated by bar 402. Also, similar to unit volumes 210 illustrated by FIG. 2, bar 403 illustrates that demarcated unit areas 420 may be used to represent available versus unavailable quantities. Connection lines 422 and 424 may still be drawn to show raw material flow and dependencies between work-in-progress subassemblies.

Figure 5:
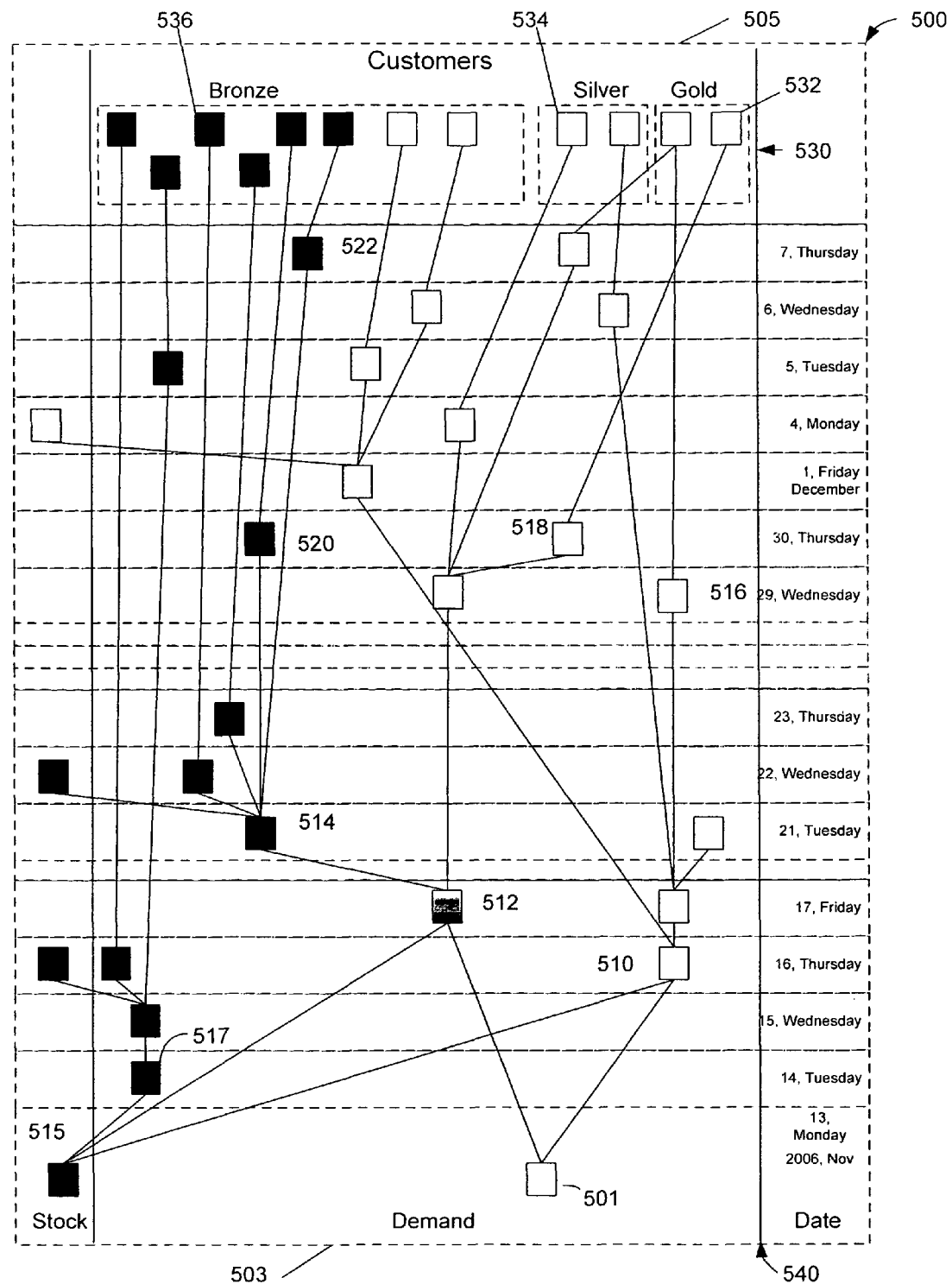
FIG. 5 illustrates an exemplary two dimensional rendering of a production process highlighting the distribution of a selected raw material.

FIG. 5 illustrates a 2D rendering of a user interface embodiment. A bar 501 at a bottom end 503 of a field 500 represents a missing quantity of raw material (i.e., bar 501 is shaded to indicate no available quantity). The middle rows of bars, e.g., 510-522, illustrate various production orders 510-514 and subsequent sales orders 516-522 that each require a quantity of raw-material represented by bar 501. The row of bars 530 at the back end 505 of the field 500 may represent customers that will receive one or more orders with products using the specific raw-material. If a customer has a white bar, e.g., 532, the customer may lack a quantity of some product that depends on the missing raw-material, thus their order(s) may not be able to ship in full on the expected date. In FIG. 5, a time axis 500 runs along a vertical (or longitudinal) edge of the field 500. As discussed above, because some production orders take more than one day, a gray line or vertical bar (not shown) may disposed on the floor represent the duration of an operation. Stock inventory bars (e.g., 515) may be disposed on a left hand side of the field.

In the 2D user interface view of FIG. 5, a planner desiring to reallocate available raw materials may select a bar having availability of raw material (e.g., 517 that draws from stock inventory) and drag a slice of the bar to an unavailable bar (e.g., 510), where both bars relate to the same upstream parent bar (i.e., stock bar 515). Each drag and drop sequence may represent the reallocation of a unit quantity, as defined by the system or user. In one embodiment, dragging one bar to another bar may display a transfer selection screen in which a user may be allowed to designate (e.g., by typing in a transfer amount or select a quantity) a quantity for transfer. This may move a portion of the available quantity and may initiate a refresh or update of the view, showing a current distribution of raw material based on the reallocation.

The data used for the views may be generated from data in an ERP database(s). The user interface may be associated with instructions or logic that queries one or more databases and tables to the information needed to draw the view. In one embodiment, a system may first query a production orders table for upcoming production orders that have reservations against a raw material. This may represent a first order query that shows all direct subassemblies that use the raw material as a direct input. The system may then query for sub-assemblies that use inputs that are work-in-progress products comprising the raw material (or requiring the raw material as an input to produce a work-in-progress product). This query may represent a second order query of production orders that have reservations against the first order subassembly work-in-progress products. The querying may proceed recursively to search for higher order subassemblies until a finished product order is reached. If a production order outputs a finished product, the view may then search for sales orders that have reservations against the produced product. Further, the system may then query for customers associated with the sales orders.

A calculation may then be performed to assess if each order will get a required quantity of raw material based on a default distribution. The collection of data from the queries and calculation may then be used to render a view of the production orders depending on the raw material and their inter-dependencies (as described above). Briefly, if a (full or partial) quantity is available, then a portion of the bar representing the available quantity may be colored a first color (as described above), such as blue. If a bar needs a higher quantity than it will receive, then a portion of the bar representing the missing quantity will may be colored a second color, such as red. If the output of one order is consumed by multiple subsequent orders, then, in one embodiment, the earliest and then the largest subsequent orders are fulfilled first, followed by the latest and then smallest orders.

FIG. 6 illustrates a database table that may be used in existing ERP systems to track production orders in a production process. The table may list an item number 602, an item description 604, a quantity demanded 606, a downstream reservation for the item 608, and an upstream reservation for the item 610. If more than one input is required, then multiple input fields may be used, or alternatively, multiple entries. In one database implementation, the reservations may be managed by relational tables. For example, each reservation may indicate only one-to-one relationships (for example "B uses A," but not also "B is used by C" in the same reservation), but are associated by relational tables. FIG. 7 illustrates a view 700 that may be used to represent a single product order for motors 701 that may indicate upstream dependencies or reservations 703. Although not shown, the view may include downstream reservations for the motors 701. As FIG. 7 illustrates, however, a manager may be unable to determine, in a single view, all product dependencies, much less product dependencies based on a selected raw material input. Further, as illustrated by FIG. 7, managers may not be able to determine effects of raw material shortages. Instead, a manager may only be able to query the databases and perform his own distribution calculations.

In contrast to current ERP applications, a production planner or manager may use the above described system to obtain a full view of the involved orders and may be able to simulate the consequences of feeding available quantities to specific operations. Moreover, the above described user interface may map the product orders on a date timeline that display additional chronological parameters to the production order availability that may be used by the manager.

The invention claimed is:

1. A method of displaying a three-dimensional (3D) rendering of raw material distribution in a production process comprising:
   electronically displaying on a display unit a field, wherein a proximal end of the field appears to be closer than a distal end based on a user's point of view;
   electronically displaying on said display unit a first lane along a longitudinal length of the field representing a time axis;
   electronically displaying on said display unit a plurality of raw material bars representing orders of raw materials in a stock segment of the field laid out along the longitudinal length of the field;
   electronically displaying on said display unit a plurality of work-in-progress bars representing orders for first work-in-progress products comprising the raw materials and further representing subassemblies that produce second work-in-progress products based on the first work-in-progress products, the work-in-progress bars positioned in a demand segment of the field laid out along the longitudinal length of the field;
   electronically displaying on said display unit a plurality of finished product bars representing products to be delivered to a customer to fulfill a sales order of the customer in a customers segment laid out along a lateral length of the field;
   electronically displaying on said display unit a plurality of connection lines between two or more raw material bars, work-in-progress bars, and finished product bars representing paths for the raw materials through the production process, wherein a first color of each raw material bar is used to represent a portion of a quantity of the raw material that is available for an order represented by the raw material bar and a second color of each raw material bar is used to represent a portion of the quantity of the required raw material that is unavailable for the order represented by the raw material bar but necessary to fill the order; and
   electronically rendering on said display unit a reallocation of an available upstream product from a first downstream product order to a second downstream product order when the first and second downstream product order use the same upstream product as an input, wherein the rendering the reallocation comprises dragging a portion of the first color segment of a first bar to a second bar on said display unit if the first bar and second bar are connected to a common upstream bar.

2. The method of claim 1, wherein the indication at each bar of a total quantity of raw material is based on a height of each of the plurality of raw material bars and wherein a first color is used to color a bottom portion of each bar and a second color is used to color a remaining top portion of each bar.

3. The method of claim 1, wherein a first and second color of the finished product bars further represent a portion of a total order of a customer that will be fulfilled and a portion of a total order of the customer that will not be fulfilled, respectively.

4. The method of claim 3, wherein the finished product bars are displayed in an arrangement based on a supplier designated preference.

5. The method of claim 1, further comprising an algorithm for determining the dependencies between upstream products and downstream production orders that includes:
   querying a production order table for upcoming work-in-progress production orders that have reservations on the raw material;
   querying for upcoming work-in-progress production orders that have reservations on work-in-progress products dependent on the raw material;
   querying for sales orders that have reservations on a finished product dependent on the raw material or dependent on a work-in-progress product dependent on the raw material; and
   querying for customers that placed the sales orders.

6. The method of claim 5, wherein the algorithm further computes the amount of the raw material needed at each bar to fulfill the order at the segment of the production process corresponding to each bar.

7. The method of claim 1, further comprising updating a coloring of downstream bars in response to the reallocation to reflect a change in raw material availability.

8. The method of claim 1, wherein the field is longitudinally partitioned into lateral strips between the proximal and distal end, the lateral strips designating a time corresponding to their intersection with the time axis.

9. The method of claim 8, wherein a longitudinal strip is added between two or more lateral strips and wherein the longitudinal strip designates a duration required to finish a production order by a work-in-progress subassembly.

10. The method of claim 9, wherein the lateral strips are collapsible.

11. The method of claim 1, further comprising:
    displaying a textual identification adjacent to each raw material bar and work-in-progress bar.

12. A computing apparatus, comprising:
    a display unit that is capable of generating video images;
    an input device;
    a processing apparatus operatively coupled to said display unit and said input device, said processing apparatus comprising a processor and a memory operatively coupled to said processor; and
    a network interface connected to a network and to the processing apparatus; said processing apparatus being programmed to:

display a field, wherein a proximal end of the field appears to be closer than a distal end based on a user's point of view;

display a first lane along a longitudinal length of the field representing a time axis;

display a plurality of raw material bars representing orders of raw materials in a stock segment of the field laid out along the longitudinal length of the field;

display a plurality of work-in-progress bars representing orders for first work-in-progress products comprising the raw materials and further representing subassemblies that produce second work-in-progress products based on the first work-in-progress products, the work-in-progress bars positioned in a demand segment of the field laid out along the longitudinal length of the field;

display a plurality of finished product bars representing products to be delivered to a customer to fulfill a sales order of the customer in a customers segment laid out along a lateral length of the field;

display a plurality of connection lines between two or more raw material bars, work-in-progress bars, and finished product bars representing paths for the raw materials through the production process, wherein a first color of each raw material bar is used to represent a portion of a quantity of the raw material that is available for an order represented by the raw material bar and a second color of each raw material bar is used to represent a portion of the quantity of the required raw material that is unavailable for the order represented by the raw material bar but necessary to fill the order; and rendering a reallocation of an available upstream product from a first downstream product order to a second downstream product order when the first and second downstream product order use the same upstream product as an input, wherein the rendering the reallocation comprises dragging a portion of the first color segment of a first bar to a second bar if the first bar and second bar are connected to a common upstream bar.

13. The computing apparatus of claim 12, wherein the processing apparatus is further programmed to modify the amount of raw material allocated to a bar and update any bars affected by the reallocation to reflect the modification.

14. A computer readable memory device having computer executable instructions that when executed on a computer in a production planning environment implements a user interface on the computer having rendered thereon a set of raw material dependent product orders, wherein the instructions comprise:

displaying a field, wherein a proximal end of the field appears to be closer than a distal end based on a user's point of view;

displaying a first lane along a longitudinal length of the field representing a time axis;

displaying a plurality of raw material bars representing orders of raw materials in a stock segment of the field laid out along the longitudinal length of the field;

displaying a plurality of work-in-progress bars representing orders for first work-in-progress products comprising the raw materials and further representing subassemblies that produce second work-in-progress products based on the first work-in-progress products, the work-in-progress bars positioned in a demand segment of the field laid out along the longitudinal length of the field;

displaying a plurality of finished product bars representing products to be delivered to a customer to fulfill a sales order of the customer in a customers segment laid out along a lateral length of the field;

displaying a plurality of connection lines between two or more raw material bars, work-in-progress bars, and finished product bars representing paths for the raw materials through the production process, wherein a first color of each raw material bar is used to represent a portion of a quantity of the raw material that is available for an order represented by the raw material bar and a second color of each raw material bar is used to represent a portion of the quantity of the required raw material that is unavailable for the order represented by the raw material bar but necessary to fill the order; and rendering a reallocation of an available upstream product from a first downstream product order to a second downstream product order when the first and second downstream product order use the same upstream product as an input, wherein the rendering the reallocation comprises dragging a portion of the first color segment of a first bar to a second bar if the first bar and second bar are connected to a common upstream bar.

15. The computer-readable memory device of claim 14, wherein the field is longitudinally partitioned into lateral strips between the proximal and distal ends, the lateral strips designating a time corresponding to their intersection with the time axis, and a longitudinal strip is added between two or more lateral strips designating a duration required to finish a production order by a work-in-progress subassembly.

* * * * *